May 20, 1958 J. R. BURNS 2,835,859
VARIABLE SPEED ALTERNATING CURRENT MOTOR SYSTEM
Filed Oct. 17, 1957 2 Sheets-Sheet 1
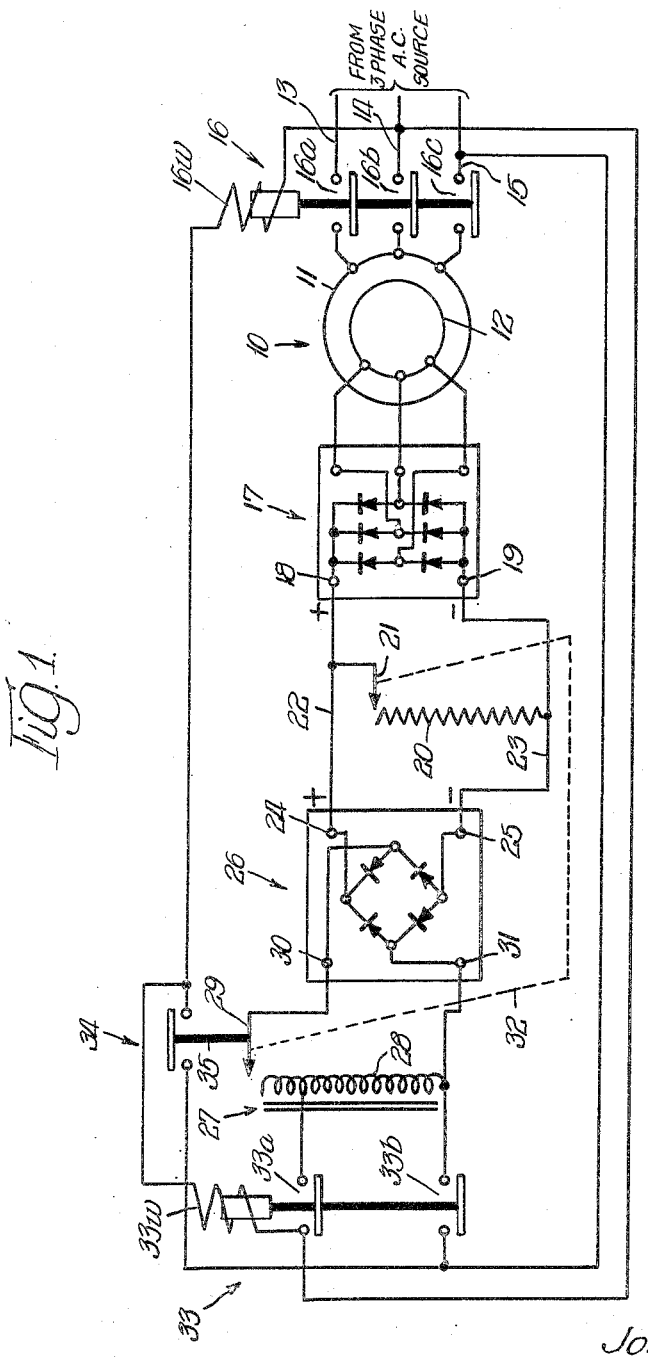
INVENTOR.
John R. Burns,
BY
Robert R. Lockwood
Atty

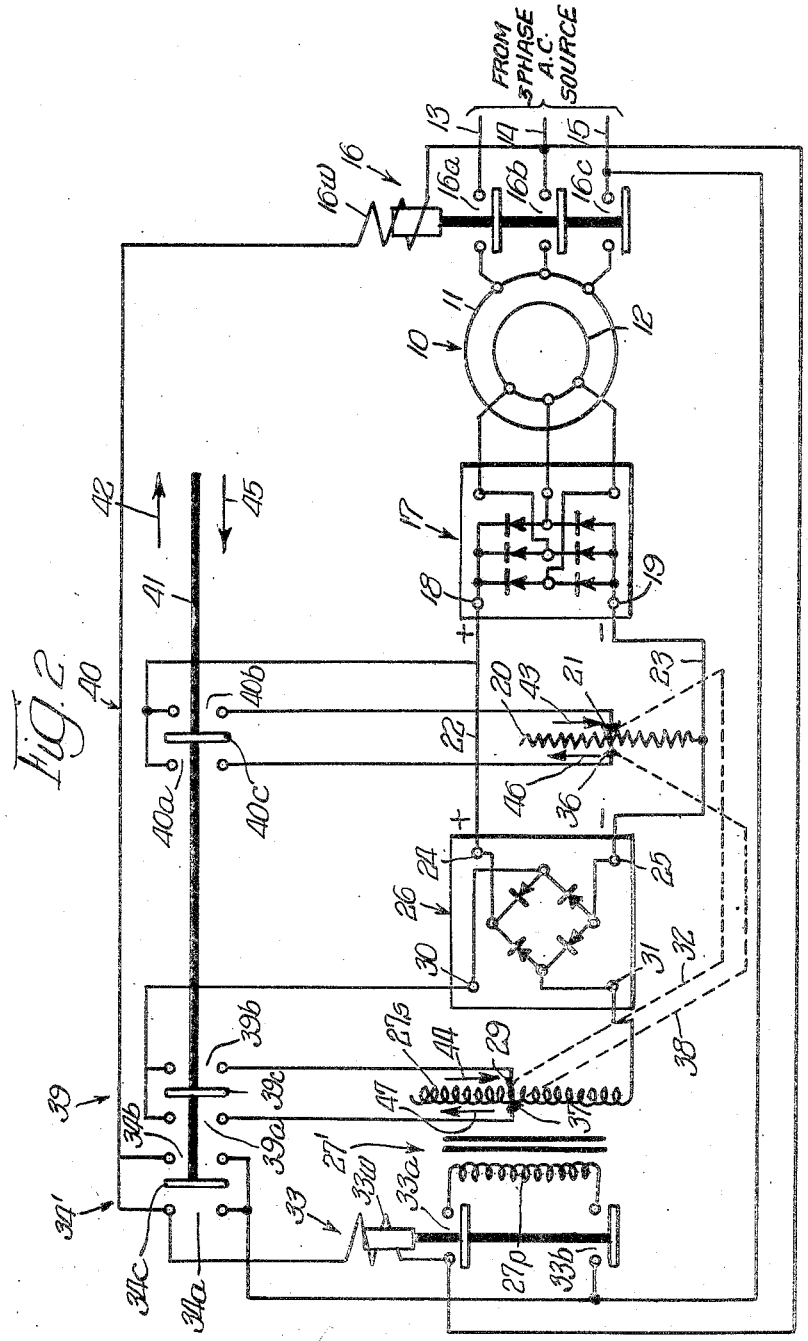

United States Patent Office 2,835,859
Patented May 20, 1958

2,835,859

VARIABLE SPEED ALTERNATING CURRENT MOTOR SYSTEM

John R. Burns, Delaware, Ohio

Application October 17, 1957, Serial No. 690,721

20 Claims. (Cl. 318—232)

This invention relates, generally, to speed control systems and it has particular relation to such systems employing alternating current motors. This application is a continuation-in-part of application Serial No. 632,686, filed January 7, 1957, now abandoned.

It is often desirable to employ wound rotor induction motors for operation under widely varying speeds and torque conditions. Also, it is useful to operate such motors at various constant speeds under varying loads, including overhauling loads, within their operative ranges. For this purpose provision has been made for varying the resistance of the rotor circuit alone or in combination with eddy current brake mechanisms. Applications of such systems are found in electrically operated elevators, cranes, hoists, etc.

Among the objects of the present invention are: To provide a simple and economical system for controlling the speed of a wound rotor induction motor for the above and other applications; to rectify the alternating current output of the wound rotor and oppose the resultant unidirectional voltage by a controllable unidirectional voltage in such manner as to vary the speed of the motor; to apply the unidirectional voltages across a common load device; to employ a resistor for the load device and reduce its effective resistance simultaneously with the reduction of the controllable voltage for effecting a corresponding increase in speed of the motor and vice versa; to provide the controllable unidirectional voltage by means of a rectifier energized by a variable voltage transformer from an alternating current source; to provide for simultaneously energizing the motor and the transformer; to control the speed of the motor regardless of the direction or degree of torque applied to the motor shaft within operating limits; to control the motor speed for driving a load and when the motor is driven by an overhauling load; and to provide for de-energizing the motor and transformer when the control is in the off position after having reduced the motor speed to zero.

Other objects of this invention will, in part, be obvious and in part appear hereinafter.

This invention is disclosed in the accompanying drawings and the scope of this application is indicated in the appended claims.

For a more complete understanding of the nature and scope of this invention, reference can be had to the following detailed description, taken together with the accompanying drawing, in which:

Figure 1 illustrates, diagrammatically, a preferred embodiment of the invention; and Figure 2 illustrates, diagrammatically, a modification of the system shown in Figure 1 and arranged to accommodate overhauling loads as well as controlling the operation of the motor for driving a load.

Referring now to the drawing, it will be observed that the reference character 10 designates, generally, an alternating current motor of the induction type having a polyphase stator 11 and a cooperating polyphase wound rotor 12. The stator 11 can be energized from conductors 13, 14 and 15 which, as indicated, are arranged to be connected to a three phase alternating current source, such as a 60 cycle 220–440 volt source. It will be understood that other frequencies and voltages can be used as desired. In order to selectively interconnect the stator 11 to the conductors 13, 14 and 15, contact means, shown generally at 16, is provided. The contact means may include an operating winding 16w and normally open contacts 16a, 16b and 16c. It will be understood that, when the winding 16w is energized, the contacts 16a, 16b and 16c are closed and the stator 11 is then connected for energization to the conductors 13, 14 and 15.

At the time that the stator 11 is energized voltages are induced in the polyphase wound rotor 12 of the same frequency. It is necessary to interconnect the terminals of the rotor 12 in some manner in order to permit current to flow through the windings in order to develop torque. It has been the common practice in the past to provide resistors in the circuits to the windings on the rotor 12 and to vary the effective resistance thereof for obtaining control of the speed of the rotors 12. The present invention contemplates an entirely different approach to this problem of speed control.

It will be observed that the output terminals of the rotor 12 are connected to a polyphase rectifier that is indicated, generally, at 17. The rectifier 17 preferably is a metallic rectifier such as a selenium or copper oxide rectifier. However, other types of rectifiers can be employed. The important factor to be provided is the application across output terminals 18 and 19 of the polyphase rectifier 17 of a unidirectional voltage and the application of this voltage across a load device 20, such as a variable resistor. The connection to the variable resistor 20 is completed through an adjustable connection or trap 21 with the combination being connected in shunt circuit relation between conductors 22 and 23 which are connected, as shown, to the output terminals 18 and 19 which have the polarities indicated.

In accordance with this invention provision is made for opposing the unidirectional voltage which appears between the output terminals 18 and 19 of the polyphase rectifier 17. For this purpose the conductors 22 and 23 are connected to output terminals 24 and 25 of a single phase rectifier that is indicated, generally, at 26. This rectifier can be of the metallic type previously referred to, although it will be understood that electronic tube type rectifiers can be employed, if desired. It is preferred that the opposing unidirectional voltage is applied across the conductors 22 and 23 through a rectifier in order to prevent the reverse flow of current through the variable voltage supply means and require that all current flow which takes place between the output terminals 18 and 19 of the polyphase rectifier 17 takes place through the load device or variable resistor 20.

Any suitable means can be employed for energizing the single phase rectifier 26. For example, a variable voltage transformer shown, generally, at 27, in the form of an auto-transformer can be employed. The transformer 27 may include a winding 28 provided with an adjustable connection 29, the combination being connected across input terminals 30 and 31 of the rectifier 26, as illustrated.

It is desirable that the current flow through the load device or variable resistor 20 be substantially constant with variation in voltage applied thereto from the variable voltage transformer 27. For this purpose a mechanical connection, indicated by the broken line 32, interconnects the adjustable connections 21 and 29 so that, when the latter is moved to decrease the voltage applied to energize the rectifier 26, there will be a corresponding decrease in the effective resistance of the load device or variable resistor 20. As illustrated provision is made for completely disengaging the adjustable connections 21 and 29 from the respective load device 20 and winding 28. The relationship between the adjustable connections 21 and 29 preferably is such that the adjustable connection 29 engages the winding 28 at the maximum voltage position at least as soon or sooner than the adjustable connection 21 engages the load device or variable resistor 20. One reason for this is to insure that maximum unidirectional voltage will be applied across the conductors 22 and 23 at the time that the stator 11 is energized from the polyphase alternating current source. In addition, provision is made for the unidirectional control voltage applied through the single phase rectifier 26 across the conductors 22 and 23 to be higher than the maximum unidirectional voltage appearing between the output terminals 18 and 19 of the polyphase rectifier 17 at the time that the stator 11 is first energized. It will be understood that at this time the maximum voltage is induced in the wound rotor 12 and that maximum voltage appears between the output terminals 18 and 19 from the polyphase rectifier 17.

Any suitable means can be employed for effecting the energization of the variable voltage transformer 27. For example, contactor means shown, generally, at 33 can be employed for connecting the winding 28 for energization across conductors 14 and 15 as illustrated. The contactor means 33 includes an operating winding 33$w$ and normally open contacts 33$a$ and 33$b$ which are closed, when the winding 33$w$ is energized.

With a view to effecting the simultaneous energization of the operating windings 16$w$ and 33$w$ of the contactor means 16 and 33, normally open contact means 34 are provided and, as illustrated, are arranged to connect the windings 16$w$ and 33$w$ in parallel across energized conductors 14 and 15. The operation of the contact means 34 is interlocked with the operation of the adjustable connections 21 and 29. As shown, a stem 35 is arranged to cooperate with the adjustable connection 29 so that when the latter is moved to engage the winding 28 in the maximum voltage position, the contact means 34 will be closed to complete the energizing circuits for the operating windings 16$w$ and 33$w$.

In operation, assuming suitable energization of the conductors 13, 14 and 15, the adjustable connection 29 is moved to engage the winding 28. At or after the time that this takes place the contact means 34 closes to effect the energization of the operating winding 16$w$ and 33$w$. This operation is accompanied by the engagement of the adjustable connection 21 with the load device or variable resistor 20 in the maximum resistance position. Since the voltage applied from the variable voltage transformer 27 between the output terminals 24 and 25 of the rectifier 26 is greater than the voltage appearing between the output terminals 18 and 19 of the rectifier 17 under these conditions, the current flow through the load device or resistor 20 originates solely from the rectifiers 26 and its energizing means. No current flows from the polyphase rectifier 17 and no current flows in the windings of the wound rotor 12. Accordingly, it remains stationary.

As the voltage applied to the single phase rectifier 26 is reduced by movement of the adjustable connection 29 along the winding 28, a point is reached where the voltage appearing across the output terminals 24 and 25 from the rectifier 26 is less than the voltage between the output terminals 18 and 19 of the polyphase rectifier 17. Accordingly, the current flow under these conditions through the load device or variable resistor 20 will be from the polyphase rectifier 17. Current then will flow in the windings of polyphase wound rotor 12 and it will begin to rotate. The speed of the rotor 12 will increase until the voltage output of the polyphase rectifier 17 is reduced to a point where the single phase rectifier 26 again begins to supply current to the load device or variable resistor 20. The rotor 12 will then maintain a constant speed regardless of the torque applied thereto within its operating limits. If there is an increase in the torque applied to the rotor 12, there will be a slight decrease in speed with a corresponding increase in voltage output of the polyphase rectifier 17. This results in greater current flow to the windings of the rotor 12 and a larger share of the current flow through the load device or variable resistor 20 being obtained from the polyphase rectifier 17. Essentially it will have the characteristics of a well regulated direct current shunt motor. As long as the torque applied to the rotor 12 remains the same, and other conditions remain constant, its speed will not change.

From the foregoing it will be understood that, for any given speed setting of the adjustable connection 29, if the torque applied to the rotor 12 decreases, there will be a tendency for it to increase in speed resulting in a corresponding decrease in the voltage applied to the polyphase rectifier 17. The portion of the current flow through the load device or variable resistor 20 provided by the rectifier 17 will decrease with the result that further increase in the speed of the rotor 12 is prevented.

It will be understood that the speed at which the rotor 12 operates is determined by the voltage applied to the single phase rectifier 26 and by it to the load device or variable resistor 20. As this voltage decreases there will be a corresponding increase in speed of the rotor 12 and vice versa. For example, under a given set of operating conditions, if the voltage applied to the single phase rectifier 26 from the variable voltage transformer 27 is increased, a greater portion of the current flow through the load device or variable resistor 20 will be supplied from the rectifier 26 and a correspondingly lesser amount will be supplied from the polyphase rectifier 17. The current flow through the windings of the polyphase rotor 12 will decrease with a corresponding decrease in rotor speed until the voltage applied by the polyphase rectifier 17 across the conductors 22 and 23 is sufficient to permit enough current flow in the windings of the rotor 12 to permit it to develop enough torque to maintain the new speed corresponding to the new position of the adjustable connection 29. As above pointed out, if the voltage applied to the single phase rectifier 26 is increased to the maximum value, the current flow through the windings on the wound rotor 12 will be reduced to zero and its speed will likewise be reduced to zero.

From the foregoing it will be apparent that an important factor in determining the speed of the rotor 12 is the voltage which is applied by the single phase rectifier 26 between the conductors 22 and 23. By varying this voltage it is possible to obtain any speed from zero to a maximum speed and to hold any particular speed regardless of the torque applied to the rotor 12 within its operating limits.

Referring now to Figure 2 of the drawings it will be observed that the system there shown embodies all of the features of the control system shown in Figure 1 and described hereinbefore and in addition, provision is made for controlling the speed of the motor 10 when an overhauling load is applied to the rotor 12. Insofar as possible the same reference characters have been applied in Figure 2 that were used for Figure 1.

In Figure 2 it will be noted that a two winding transformer 27' is employed having a primary winding 27$p$ that is arranged to be energized on operation of the contactor means 33 from the conductors 14 and 15. Inductively associated with the primary winding 27$p$ is a secondary winding 27$s$. It has an adjustable connection 29 which corresponds to the adjustable connection 29 for the winding 28 shown in Figure 1. However, the adjustable connection 29 in Figure 2 is initially located at a point intermediate the ends of the secondary winding 27s and is arranged to apply a decreasing voltage therefrom for energizing the rectifier 26.

A corresponding change is made in the location of the adjustable connection 21 to the load device or variable resistor 20. It initially is located intermediate the ends of the resistor 20 at a location corresponding to the location of the adjustable connection 29 along the secondary winding 27s. The mechanical connection, indicated by the broken line 32, is employed in order to permit conjoint movement of the adjustable connections 21 and 29.

Additional adjustable connections 36 and 37 are provided for the variable resistor 20 and secondary winding 27s, respectively. They are arranged to be operated conjointly by the mechanical connection, indicated by the broken line 38, for increasing the effective resistance of the resistor 20 and increasing the alternating voltage applied to the rectifier 26 for the purpose of varying the speed of the rotor 12 when an overhauling load is applied thereto.

It is desirable that provision be made for making either the adjustable connections 21 and 29 or the adjustable connections 36 and 37 effective. For this purpose contact means, shown generally at 39 and 40, are employed. The contact means 39 includes contacts 39a one of which is connected to the adjustable connection 37 while the other is commonly connected to one of contacts 39b and to the input terminal 30 of the rectifier 26. The other of the contacts 39b is connected to the adjustable connection 29. In like manner the adjustable connections 36 and 21 are connected to one of each set of contacts 40a and 40b while the others are commonly connected to the conductor 22 which interconnects the terminals 18 and 24 of the rectifiers 17 and 26. Provision is made for bridging simultaneously contacts 39a and 40a or contacts 39b and 40b by means of contact bridging members 39c and 40c. They are commonly mounted on a stem 41.

It is desirable to control the energization of the windings 16w and 33w of the contactor means 16 and 33 at the times that the bridging contact members 39c and 40c are moved to one or the other of their operative positions. For this purpose contacts 34a and 34b are employed and are arranged to be bridged by a contact bridging member 34c all of which form a part of contact means 34' and takes the place of the contact means 34, shown in Figure 1 and previously described. The bridging contact member 34c is mounted on the stem 41 for movement conjointly with the contact bridging members 39c and 40c.

It will be understood that a common control drum or other device can be employed for conjointly operating the stem 41 and the mechanical connections 32 and 38. However, for illustrative purposes the respective controls are shown independently.

Reference has been made to the possible application to the rotor 12 of an overhauling load. It may also be termed an overrunning load. In the case of a hoist or elevator such a load is of a character which is capable of overcoming the friction of the hoist mechanism and result in driving the rotor 12. Such load is illustrated by the car of an elevator when it is descending or a load which is being moved by a crane or hoist the weight of which is sufficient to overcome the friction of the hoist mechanism.

When controlling the speed of an overrunning or overhauling load, the stator 11 is energized to generate a rotating field in the opposite direction to that of the actual direction of rotation of the motor or its tendency to rotate. Any increase in the speed of the rotor 12 under these conditions results in an increase in the rotor voltage which is applied to the rectifier 17. If the alternating voltage applied by the secondary winding 27s to energize the rectifier 26 is of a value intermediate the maximum value of which it is capable of developing and if the effective value of the resistor 20 is intermediate its maximum value as connected between the conductors 22 and 23 so as to produce a voltage between these conductors which is equal to the standstill voltage of the rotor 12, then the overrunning or overhauling load, under these conditions, will drive the motor just fast enough to cause it to develop sufficient voltage to assume a share of the current flow through the resistor 20 and prevent further increase in speed. Now, if the voltage applied from the secondary winding 27s to the rectifier 26 is increased over the previously assumed value, the current in the rotor 12 will decrease and the rotor 12 will increase in speed until the voltage generated thereby is sufficient to cause enough current to flow to prevent further increase in speed. Conversely, if the voltage applied from the secondary winding 27s to the rectifier 26 is lowered from the previously assumed value, the current flow through the rotor 12 will increase and it will slow down until the current drawn is just sufficient to produce the required torque to maintain the corresponding speed. It follows that it is possible to stop and hold the rotor 12 against the effect of an overrunning or overhauling load by reducing the voltage applied from the secondary winding 27s to the rectifier 26. For operation of the system illustrated in Figure 2 when the motor 10 is to drive the rotor 12 and move a load, the stem 41 is operated in the direction indicated by the arrow 42 to complete at contacts 34b circuits for energizing the operating windings 16w and 33w of the contactor means 16 and 33. At this time it is assumed that the adjustable connections 21 and 29 are positioned as indicated in the drawings, i. e., are positioned intermediate the ends of the variable resistor 20 and secondary winding 27s. Now, as the adjustable connections 21 and 29 are moved in the directions indicated by the arrows 43 and 44, the speed of the rotor 12 is correspondingly increased in the manner described hereinbefore in conjunction with the description of the system shown in Figure 1.

When the motor 10 is operating with the rotor 12 being driven by an overrunning or overhauling load, the stem 41 is operated in the direction indicated by the arrow 45 and circuits are completed for connecting the adjustable connections 36 and 37 in the respective circuits. They are moved conjointly by the mechanical connection 38 in the directions indicated by the arrows 46 and 47 in the event that it is desired to increase the speed at which the rotor 12 rotates under the overhauling load condition.

Since certain changes can be made in the foregoing system and different embodiments of the invention can be made without departing from the spirit and scope thereof, it is intended that all matters shown in the accompanying drawings and described hereinbefore shall be interpreted as illustrative and not in a limiting sense.

What is claimed as new is:

1. A variable speed alternating current motor system comprising, in combination, an induction motor having a stator energized by alternating current and a wound rotor, rectifier means connected for energization to said wound rotor, a load device connected to said rectifier for energization by a unidirectional voltage therefrom, means for applying a second unidirectional voltage to said load device of the same polarity as applied thereto by said rectifier means, and means for varying one of said unidirectional voltages to vary the speed of said motor.

2. A variable speed alternating current motor system comprising, in combination, an induction motor having a stator energized by alternating current and a wound rotor, rectifier means connected for energization to said wound rotor, a load device connected to said rectifier for energization by a unidirectional voltage therefrom, means for applying a second unidirectional voltage to said load device of the same polarity as applied thereto by said rectifier means, and means for varying said second unidirectional voltage to vary the speed of said motor.

3. A variable speed alternating current motor system comprising, in combination, an induction motor having a stator energized by alternating current and a wound rotor, rectifier means connected for energization to said wound rotor, a load device connected to said rectifier for energization by a unidirectional voltage therefrom, means for applying a second unidirectional voltage to said load device of the same polarity as applied thereto by said rectifier means, and means for reducing simultaneously said second unidirectional voltage and the effect of said load device whereby the current flow through the latter is substantially constant and the speed of said motor is correspondingly increased.

4. A variable speed alternating current motor system comprising, in combination, an induction motor having a stator for energization by alternating current and a wound rotor, a first rectifier connected for energization to said wound rotor, a second rectifier connected for energization from a current source, circuit means interconnecting the output terminals of the same polarity of said rectifiers, a load device connected in shunt circuit relation between said circuit means, and means for varying the voltage applied by said second rectifier to effect a corresponding change in the speed of said motor.

5. A variable speed alternating current motor system comprising, in combination, an induction motor having a stator for energization by alternating current and a wound rotor, a first rectifier connected for energization to said wound rotor, a second rectifier connected for energization from a current source, circuit means interconnecting the output terminals of the same polarity of said rectifiers, a variable resistor connected in shunt circuit relation between said circuit means, and means for reducing simultaneously the voltage applied by said second rectifier to said resistor and the effective resistance thereof whereby the current flow therethrough is substantially constant and the speed of said motor is correspondingly increased.

6. A variable speed alternating current motor system comprising, in combination, an induction motor having a stator for energization by alternating current and a wound rotor, a first rectifier connected for energization to said wound rotor, a second rectifier connected for energization from an alternating current source, circuit means connecting the terminal of said rectifiers of the same polarity in parallel, a resistor connected in shunt with said parallel connected terminals, and means for varying the energizing alternating voltage applied to said second rectifier for varying the speed of said motor.

7. A variable speed alternating current motor system comprising, in combination, an induction motor having a stator for energization by alternating current and a wound rotor, a first rectifier connected for energization to said wound rotor, a second rectifier connected for energization from an alternating current source, circuit means connecting the terminals of said rectifiers of the same polarity in parallel, a variable resistor connected in shunt with said parallel connected terminals, and means for varying simultaneously the energizing voltage applied to said second rectifier and the effective resistance of said resistor for varying the speed of said motor.

8. The invention as set forth in claim 7 wherein the maximum voltage supplied by the second rectifier is greater than the voltage supplied by said first rectifier when the stator is energized and the rotor is stationary.

9. The invention as set forth in claim 7 wherein the motor is a polyphase motor having a polyphase rotor and the first rectifier is a polyphase rectifier.

10. A variable speed alternating current motor system comprising, in combination, a polyphase induction motor having a stator and a wound rotor, means for connecting said stator for energization to a polyphase current source, a first rectifier connected for energization to said wound rotor, a variable voltage transformer and means for connecting the same for energization to an alternating current source, a second rectifier connected for energization to said transformer and having its output terminals connected in parallel with the output terminals of the same polarity of said first rectifier, and a resistor connected across said output terminals.

11. A variable speed alternating current motor system comprising, in combination, a polyphase induction motor having a stator and a wound rotor, means for connecting said stator for energization to a polyphase current source, a first rectifier connected for energization to said wound rotor, a variable voltage transformer and means for connecting the same for energization to an alternating current source, a second rectifier connected for energization to said transformer and having its output terminals connected in parallel with the output terminals of the same polarity of said first rectifier, a variable resistor connected across said output terminals, and means cooperating with said transformer and said resistor for simultaneously reducing the energizing voltage applied to said second rectifier and the effective resistance of said resistor to increase the speed of said motor and vice versa.

12. A variable speed alternating current motor system comprising, in combination, a polyphase induction motor having a stator and a wound rotor, means for connecting said stator for energization to a polyphase current source, a first rectifier connected for energization to said wound rotor, a variable voltage transformer and means for connecting the same for energization to an alternating current source, a second rectifier connected for energization to said transformer and having its output terminals connected in parallel with the output terminals of the same polarity of said first rectifier, a resistor connected across said output terminals, the maximum output voltage of said second rectifier being greater than the output voltage of said first rectifier when said stator is energized and said rotor is stationary, and means for operating said connecting means to energize said stator and transformer respectively when the latter is connected to apply maximum voltage to said second rectifier.

13. The invention as set forth in claim 12 wherein the resistor is variable and means are provided for simultaneously reducing the voltage applied by said transformer to said second rectifier and the effective resistance of said resistor whereby the speed of said motor is increased and vice versa.

14. A variable speed alternating current motor system comprising, in combination, a polyphase induction motor having a stator and a polyphase wound rotor, contactor means for connecting said stator for energization to a polyphase current source including an operating winding, a polyphase rectifier connected for energization to said wound rotor, a variable voltage transformer having an adjustable connection in off position disconnected therefrom, contactor means for connecting said transformer for energization to an alternating current source including an operating winding, a single phase rectifier connected for energization to said transformer through said adjustable connection, circuit means interconnecting the output terminals of the same polarity of said rectifiers, a variable resistor having an adjustable connection connected in shunt circuit relation between said circuit means, circuit means connecting said operating windings for energization to a current source including normally open contact means cooperating with the adjustable connection of said transformer and held in open position when the same is in said off position for effecting the energization of said operating windings prior to the energization of said single phase rectifier, the maximum output voltage of said single phase rectifier exceeding the output voltage of said polyphase rectifier on initial energization of said stator, and means mechanically interconnecting said adjustable connections whereby the current flow through said resistor is substantially constant for all positions of said adjustable connection of said transformer and the speed of said rotor remains substantially constant for any position of said adjustable connection of said transformer regardless of the torque required to be developed by said rotor within the operating limits thereof.

15. A variable speed alternating current motor system comprising, in combination, an induction motor having a stator energized by alternating current and a wound rotor, rectifier means connected for energization to said wound rotor, a load device connected to said rectifier for energization by a unidirectional voltage therefrom, means for applying a second unidirectional voltage to said load device of the same polarity as applied thereto by said rectifier means, and means for varying one of said unidirectional voltages to vary the speed of said motor for driving a load and for overhauling loads.

16. A variable speed alternating current motor system comprising, in combination, an induction motor having a stator energized by alternating current and a wound rotor, rectifier means connected for energization to said wound rotor, a load device connected to said rectifier for energization by a unidirectional voltage therefrom, means for applying a second unidirectional voltage to said load device of the same polarity as applied thereto by said rectifier means, and means for varying said second unidirectional voltage to hold said rotor against rotation by an overhauling load in accordance with the magnitude thereof.

17. A variable speed alternating current motor system comprising, in combination, an induction motor having a stator energized by alternating current and a wound rotor, rectifier means connected for energization to said wound rotor, a load device connected to said rectifier for energization by a unidirectional voltage therefrom, means for applying a second unidirectional voltage to said load device of the same polarity as applied thereto by said rectifier means, and means for changing simultaneously said second unidirectional voltage and the effect of said load device to vary the speed of said motor for driving and overhauling loads.

18. A variable speed alternating current motor system comprising, in combination, an induction motor having a stator energized by alternating current and a wound rotor, a first rectifier connected for energization to said wound rotor, means providing a source of alternating current, a second rectifier connected for energization to said source of alternating current, circuit means interconnecting the output terminals of the same polarity of said rectifiers, a variable resistor connected in shunt circuit relation between said circuit means, and means for changing simultaneously the voltage applied by said second rectifier to said resistor and the effective resistance thereof to vary the speed of said motor.

19. A variable speed alternating current motor system comprising, in combination, an induction motor having a stator energized by alternating current and a wound rotor, a first rectifier connected for energization to said wound rotor, means providing a source of alternating current, a second rectifier connected for energization to said source of alternating current, circuit means interconnecting the output terminals of the same polarity of said rectifiers, a variable resistor connected in shunt circuit relation between said circuit means, means for simultaneously increasing the voltage above a predetermined value applied by said source to said second rectifier and the effective resistance of said resistor above a predetermined value to vary the speed of said motor on application thereto of overhauling loads, and means for simultaneously decreasing the voltage below said predetermined value thereof applied by said source to said second rectifier and the effective resistance of said resistor below said predetermined value thereof to vary the speed of said motor on application thereto of loads to be driven.

20. A variable speed alternating current motor system comprising, in combination, an induction motor having a stator energized by alternating current and a wound rotor, a first rectifier connected for energization to said wound rotor, means providing a source of alternating current, a second rectifier connected for energization to said source of alternating current, circuit means interconnecting the output terminals of the same polarity of said rectifiers, a variable resistor connected in shunt circuit relation between said circuit means, means for simultaneously increasing the voltage above a predetermined value applied by said source to said second rectifier and the effective resistance of said resistor above a predetermined value to vary the speed of said motor on application thereto of overhauling loads, means for simultaneously decreasing the voltage below said predetermined value thereof applied by said source to said second rectifier and the effective resistance of said resistor below said predetermined value thereof to vary the speed of said motor on application thereto of loads to be driven, and means for shifting the control of said motor from one to the other of the last named means.

No references cited.